United States Patent
Sander

(10) Patent No.: US 10,245,598 B2
(45) Date of Patent: Apr. 2, 2019

(54) LABORATORY CENTRIFUGE AND METHOD FOR OPERATING THE SAME WITH A REVERSED DRIVING MOTION OF THE ROTOR DURING ACCELERATION AND DECELERATION

(71) Applicant: Sigma Laborzentrifugen GmbH, Osterode (DE)

(72) Inventor: Michael Sander, Osterode (DE)

(73) Assignee: SIGMA LABORZENTRIFUGEN GMBH, Osterode (DE)

( * ) Notice: Subject to any disclaimer, the term of this patent is extended or adjusted under 35 U.S.C. 154(b) by 385 days.

(21) Appl. No.: 15/088,647

(22) Filed: Apr. 1, 2016

(65) Prior Publication Data

US 2016/0288141 A1    Oct. 6, 2016

(30) Foreign Application Priority Data

Apr. 2, 2015    (EP) .................................... 15162405

(51) Int. Cl.
| | |
|---|---|
| B04B 5/04 | (2006.01) |
| B04B 9/10 | (2006.01) |
| B01D 21/26 | (2006.01) |
| B04B 13/00 | (2006.01) |

(52) U.S. Cl.
CPC .............. B04B 9/10 (2013.01); B01D 21/262 (2013.01); B04B 5/0414 (2013.01); B04B 13/00 (2013.01)

(58) Field of Classification Search
CPC ..... B01D 21/262; B04B 13/00; B04B 5/0414; B04B 9/10
USPC ............................................... 494/37, 82, 84
See application file for complete search history.

(56) References Cited

U.S. PATENT DOCUMENTS

| | | | |
|---|---|---|---|
| 2,821,339 | A | 1/1958 | Wyble |
| 2005/0026765 | A1 | 2/2005 | Escal |
| 2008/0182742 | A1 | 7/2008 | Porto |
| 2015/0031521 | A1 | 1/2015 | Wang et al. |

FOREIGN PATENT DOCUMENTS

| | | | | |
|---|---|---|---|---|
| DE | 10 2012 201 717 | | 8/2013 | |
| EP | 2835178 A1 | * | 2/2015 | ............. B03C 1/002 |
| EP | 2 835 178 A1 | | 11/2015 | |
| WO | WO-2013117606 A1 | * | 8/2013 | ........... B04B 5/0414 |

* cited by examiner

*Primary Examiner* — Walter D. Griffin
*Assistant Examiner* — Shuyi S. Liu
(74) *Attorney, Agent, or Firm* — Thomas | Horstemeyer, LLP

(57) ABSTRACT

The invention relates to a method for the operation of a laboratory centrifuge (1), wherein a rotor (2) rotates around a horizontal rotational axis (3). It should be avoided that during the start-up of the laboratory centrifuge (1) or the deceleration of the laboratory centrifuge (1) for small angular velocities and small centrifugal forces resulting therefrom due to the gravitational acceleration the product (6) is biased by resulting components of the acceleration in vertical direction which change their sense of direction. For this purpose the acceleration of the rotor (2) is chosen such that when arriving for the first time in a reversing angular position (twelve o'clock position) there is already a centrifugal acceleration being larger than the gravitational acceleration. The corresponding applies for the deceleration of the rotor after the centrifugation.

25 Claims, 13 Drawing Sheets

LABORATORY CENTRIFUGE AND METHOD FOR OPERATING THE SAME WITH A REVERSED DRIVING MOTION OF THE ROTOR DURING ACCELERATION AND DECELERATION

CROSS REFERENCE TO RELATED APPLICATIONS

This application claims priority to co-pending European Patent Application No. EP 15 162 405.3 entitled "Laborzentrifuge and Verfahren zum Betrieb derselben", filed Apr. 2, 2015.

FIELD OF THE INVENTION

The present invention relates to a laboratory centrifuge and a method for operating the same. Laboratory centrifuges of this type are used e.g. in the biotechnology, the pharmaceutical industry, medicine and environmental analytics. By means of a laboratory centrifuge a product (in particular a container or vessel with a probe or substance located therein) is centrifuged with numbers of revolution which might exceed more than 3,000 revolutions/min (e.g. 15,000 revolutions/min or more). In this way e.g. accelerations acting upon the product are generated which might be larger than 15,000×g, e.g. more than 16,000×g, more than 20,000×g up to more than 60,000×g. By the centrifugation it is intended to separate a mixture of substances formed by the probe or the substance into components of differing densities. It is possible that during the centrifugation there is a specific control of the pressure and/or temperature conditions dependent on the chemical and/or physical properties of the mixture of substances. In order to mention only some examples, it is possible to use a laboratory centrifuge in connection with a polymerase-chain reaction (PCR),
a determination of the hematocrit,
cytological analyses or
the centrifugation of microtiters, blood bags, vessels for mineral oil or blood vessels and the like.

BACKGROUND OF THE INVENTION

Generally, in laboratory centrifuges rotors are used which are embodied as drum rotors or swing-bucket rotors and rotate around a vertical rotational axis.

U.S. Pat. No. 2,821,339 A discloses a laboratory centrifuge, wherein a rotor is rotated with a low rotational speed around a rotational axis having a horizontal orientation. Here, the rotor is directly held by a drive stud of an electrical drive. The rotor is formed by a drum with a hollow cylindrical drum wall. On the side facing towards the drive the drum is closed by a supporting plate having the shape of a circular disc. The drum is open on the side facing away from the drive. A plurality of mounts for vessels with the probes being centrifuged are held at the drum wall, wherein the mounts are dispersed in circumferential direction and nested into each other. Here, the mounts are formed by spring clips which are formed by two spring arms having an orientation in radial inner direction and which open in inner direction in the shape of a V. It is possible to insert the containers from the open side of the drum in a direction parallel to the rotational axis of the rotor between spring arms of a mount or between adjacent spring arms of two neighboring mounts. In this way, the container is clamped by the spring arms. Here, the longitudinal axis of the container has an orientation parallel to the rotational axis of the rotor. A lid or closure of the container is located on the side facing away from the drive. It is possible that a plurality of drum walls having differing diameters is concentrically nested. In this way, it is possible to increase the number of containers centrifuged by the rotor.

The publication US 2008/0182742 A1 discloses a centrifuge, wherein a plurality of rotors having the shape of circular discs rotate around a common horizontal rotational axis. By a common drive or a plurality of individual drives it is possible to drive the rotors in common. However, it is also possible that during the continued centrifugation with other rotors one rotor is decoupled from the at least one drive. Probes that have already been centrifuged are removed from this rotor and the rotor is then equipped with a new probe with subsequent restart of the driving of the rotor with the associated drive. In this way, it is not required to interrupt a centrifugation by a single rotor or a plurality of rotors when loading or unloading another rotor. It is possible to displace the rotor transverse to the rotational axis in order to uncouple the rotor from the driving connection, e.g. a driving drum. A loading and unloading of a rotor is accomplished by a loading and unloading device. Via a rail the loading and unloading device is displaceable parallel to the rotational axis so that it is possible that the loading and unloading device cooperates with different rotors. Furthermore, the loading and unloading device comprises an actuator. By the actuator it is possible to feed a new probe from the outside towards the rotational axis to a mount of the rotor and in opposite direction to remove a probe that has been completely centrifuged from a mount in radial direction from the rotational axis of the rotor.

DE 10 2012 201 717 A1, corresponding to US 2015/0031521 A1, discloses a centrifuge, wherein a plurality of modules each comprise a rotor. The rotor comprises a horizontal rotational axis and forms a trough-shaped accommodation. The longitudinal axis of the accommodation has an orientation parallel to the rotational axis and comprises a U-shaped cross-section with slightly diverging side legs of the U. The rotational axis runs approximately in the middle of the U and has an orientation vertical to the plane of extension of the U. It is possible that a plurality of probe vessels are arranged and held one behind another in the direction of the rotational axis in the accommodation. Longitudinal axes of probe channels of a plurality of probe vessels are arranged parallel to each other in a common plane which has an orientation radial to the rotational axis. The modules comprise a rotational position sensor for sensing the rotational position of the accommodation. For the loading of probes into the accommodation as well as for the removal of probes from the accommodation after the centrifugation the accommodation is moved into a loading and unloading position under use of the signal of the rotational position sensor. In the loading and unloading position the longitudinal axes of the probe channels have an orientation parallel to the gravitational acceleration. A centrifugation is here accomplished with rotational speeds of more than 3,000 revolutions/min with the intention that an oscillating component of the acceleration acting upon the probes due to the gravitational acceleration builds a disturbance with an influence of less than one percent. By a balancing device comprising a balancing mass it is possible to remove any unbalanced mass of the rotor. Preferably, the probe carriers to be centrifuged are so called "gel cards" which comprise a plurality of probe channels. It is intended that the probe carrier is held at the accommodation by a latching means. For the provision of a small constructional space of the rotor it is possible that the probe carriers are arranged with a distance from the rotational axis being sufficiently small such that an end of a probe channel is located on the rotational axis. It is possible that the loading and/or unloading is provided by gripping tools of a loading automatic unit or by means of a pipetting device. Here, the loading and unloading is performed in the loading and unloading position of the accommodation with the introduction of the probe or the probe carrier from above between the side legs of the U-shaped accommodation and removal of the probe or the probe carrier after the centrifugation also in upper direction.

EP 2 835 178 A1 discloses a centrifuge which is used for washing of microtiter plates. In the centrifuge the microtiter plates are rotated around a horizontal rotational axis. In order to clean or wash the microtiters the openings of the microtiter plates have an orientation in radial outer direction such that the centrifugal force acting upon a fluid in the microtiter plates forces the fluid out of the microtiter plates. The centrifuge is driven with a number of revolutions of the drive of 5 to 3,000 revolutions per min. For another embodiment, the centrifuge is used for centrifuging reaction vessels or of blood for blood banks. In this case, the openings of the reaction vessels have an orientation in radial inner direction. Starting from a resting angular position, the reaction vessels are accelerated over an angle of 180° such that in a reversing angular position reached in this way at least a centrifugal acceleration of 1 g has been reached. Accordingly a leakage of the substance in the reaction vessel in downward direction is avoided. The document describes problems when accelerating microtiter plates with small recesses for the substances located in the reaction vessels because an undesired sloshing of the substance from one reaction vessel to an adjacent reaction vessel might occur caused by the acceleration. As a remedial measure, the document proposes to use an acceleration of 500 revolutions per min/sec up to 1,200 revolutions per min/sec.

Further prior art is known from US 2005/0026765 A1.

SUMMARY OF THE INVENTION

The present invention relates to a method for operating a laboratory centrifuge for centrifuging a product. Preferably, the product is a container or vessel which contains a probe or a substance. The container or vessel might comprise an upper opening for introducing the probe or substance and/or for removing the same. It is possible that during the centrifugation the upper opening of the vessel or container is open or closed (e.g. by a lid or plug).

The laboratory centrifuge used within the frame of the invention comprises a rotor of any design which rotates around a horizontal rotational axis. The product is held at the rotor at a distance from the rotational axis for the generation of a centrifugal force. Here, the holding of the product at the rotor might be provided in any fashion. The product might be held rigidly or movably at the rotor, generally corresponding to a swing-bucket rotor or comparable to a gondola of a big wheel. To mention another non-limiting example, the holding of the product at the rotor might be provided such that a longitudinal axis of the product has an orientation radial to the rotational axis. In this case, the opening of the container or vessel faces towards the rotational axis.

With the novel invention, it is e. g. possible to improve
a method for operating a laboratory centrifuge, wherein
the rotor rotates around a horizontal rotational axis and
a laboratory centrifuge
in particular with respect to the result achieved by the centrifugation and/or the spectrum of use of the products that can be centrifuged by the laboratory centrifuge.

The prior art accepts that during the starting and deceleration of the laboratory centrifuge the product is temporarily biased with vertical accelerations or components of the acceleration having changing senses of direction dependent on the angular position of the product at the rotor with respect to the rotational axis. If e.g. a longitudinal axis of a container with the product has an orientation radial to the rotational axis with an opening of the container facing towards the rotational axis (in the following also named "exemplary arrangement") for neglectably small centrifugal forces at the beginning of the initial acceleration as well as at the end of the deceleration in a six o'clock position of the product the gravitational acceleration acts towards the bottom of the container, so away from the upper opening of the container. Instead in the twelve o'clock position, the gravitational acceleration acts in opposite direction, so away from the bottom of the container and towards the opening of the container. As long as the rotor rotates with an angular velocity generating a non-sufficient centrifugal acceleration, the centrifugal acceleration causes that in the twelve o'clock position the resultant acceleration (which biases the probe or substance and which results from the superposition of the centrifugal acceleration and the gravitational acceleration) will be reduced. Nevertheless, in the orbit of the product around the rotational axis the sense of the direction of the resultant acceleration acting in vertical direction of the probe changes. Both during the start-up of the laboratory centrifuge as well as during the deceleration of the laboratory centrifuge this leads in some circumstances to an undesired remixing of the probe which in the end in an undesired fashion deteriorates the result of the centrifugation. On the other hand, the reversal of the resultant acceleration in the upper half plane bears the risk that the probe exits through the upper opening of the container. Accordingly, in some cases the use of the laboratory centrifuge is limited to products with a container or vessel having a closed upper opening. For open containers or vessels the use of the laboratory centrifuge is limited to products for which the flowability of the probe or substance and/or a capillarity is defined such that a leakage of the probe or substance is not possible at least during the time interval in which the probe is located in the angular region of the upper half plane.

Without this necessarily being the case it is possible that two measures are cumulatively or alternatively used for avoiding these disadvantages and/or limitations:

a) One embodiment of the invention relates to the start-up of the laboratory centrifuge. According to the invention, in the beginning the product is located at the rotor in a resting angular position (or moved into the same). In the resting angular position, the rotor with the product has an angular velocity of zero. In this resting angular position, the product is located between a three o'clock position and a nine o'clock position (so in the lower half of an imaginary clock-face). Accordingly, in the resting angular position in any case the gravitational acceleration acts at least with one component from the rotational axis in radial outer direction. In the "exemplary arrangement" in the resting angular position at least one component of the gravitational acceleration acts upon the probe towards the bottom of the container. Starting from this resting angular position, the rotor is then accelerated until for the first time the product is located in the twelve o'clock position. In the twelve o'clock position, the sense of direction of the effect of the gravitation has reversed when compared to the six o'clock position. Accordingly, this twelve o'clock position is denominated as reversing angular position.

In order to avoid that the sense of direction of the resultant acceleration (which results from the superposition of the gravitational acceleration and the centrifugal acceleration) reverses according to the invention the rotor is accelerated in a way such that the rotor when arriving at the reversing angular position has already reached an angular velocity having a magnitude such that the centrifugal acceleration which acts upon the product is already larger than the gravitational acceleration. In this way, in the reversing angular position a resultant acceleration is applied which is slightly larger than zero and has an orientation in radial outer direction. For the "exemplary arrangement" this means that also in the reversing angular position the probe in the container is at least slightly accelerated towards the bottom of the container. Accordingly, according to the invention the resultant acceleration which acts upon the product during the start-up of the laboratory centrifuge has no vertical component which changes the sense of direction.

b) It is also possible that the decelerating process towards the resting angular position is initiated in the reversing angular position if in the reversing angular position the angular velocity is within a predefined angular velocity region (as long as it is provided that in the reversing angular position the angular velocity is sufficiently high such that the centrifugal acceleration acting upon the product is larger than the gravitation acceleration). It is also possible that before purposeful a specific predefined angular velocity has been brought about. Then starting from this predefined specific angular velocity when approaching the reversing angular position of the product the above explained accelerating process towards the resting angular position is performed.

Within the frame of the invention, the acceleration during the start-up and/or the deceleration (from an angular velocity for which the centrifugal acceleration is higher than the gravitational acceleration to an angular velocity of zero (or vice versa)) is provided over an angle being smaller than 270° and larger than 180°, preferably between 185° and 265° or between 200° and 250°.

For the generation of the required acceleration or deceleration there are a lot of different options. To mention a non-limiting example, the drive and the control of the same might be chosen such that it is possible to produce the required accelerating or decelerating torques in the given angular region. According to another non-limiting example, it is possible to achieve the acceleration or deceleration by the purposeful coupling or decoupling of an inertial mass. In this way, it is possible that for the acceleration process first (in some cases also in a longer lasting acceleration process) an inertial mass is provided with a kinetic rotational energy which is at least as large as the kinetic energy when rotating the rotor and the inertial mass together with an angular velocity for which the centrifugal acceleration is larger than the gravitational acceleration. In the beginning during this acceleration process of the inertial mass the rotor with the product is in the resting angular position. If the required kinetic energy has been reached, then the inertial mass is coupled to the rotor such that the inertial mass "takes the rotor along". Here, it is possible that the coupling is immediately or successively closed, that a coupling closed in a controlled fashion is used or a friction clutch is used. The complete coupling of the rotational movement of the inertial mass with the rotational movement of the rotor is terminated before the arrival in the reversing angular position so that in the reversing angular position the product and the rotor have reached the required angular velocity.

With the specification that in the reversing angular position the rotor comprises an angular velocity being sufficiently high that the centrifugal acceleration acting upon the product is larger than the gravitational acceleration only a lower limit is specified. Preferably, the angular velocity in the reversing angular position has a magnitude such that the centrifugal acceleration acting upon the product at least doubles the gravitational acceleration.

According to the invention the resting angular position differs from a six o'clock position (however, still provided that the product in the resting angular position is located between the three o'clock position and the nine o'clock position). Preferably the resting position ist between the six o'clock position and the three o'clock position, e. g. between the 5:30 o'clock position and the 3:30 o'clock position. If e.g. in an extreme consideration the resting angular position is a three o'clock position (so that a non-flowable medium building the probe is just not accelerated towards the rotational axis) the probe on its way to the reversing angular position passes an angle of 270°. Here, after the acceleration over an angle of 90° with the arrival in the six o'clock position the product has already been accelerated to an angular velocity differing from zero. All in all, by this measure it is possible to increase the angle provided for accelerating the rotor and the product for reaching the required angular velocity in the reversing angular position. With this increase of the angle it is (on the one hand) possible to reduce the required accelerating and decelerating forces so that it is possible to reduce the requirements for the drive and the control of the same. On the other hand, in some cases an excess acceleration or deceleration between the resting angular position and the reversing angular position leads to an undesired tangential acceleration acting upon the product. By the increase of the angle over which the acceleration or deceleration is provided, it is possible to reduce the tangential acceleration.

According to the invention the loading and unloading of the product to and from the rotor is provided in a loading and unloading position which corresponds to the six o'clock position. Subsequently, first by the drive the rotor is transferred with a first sense of rotational direction into the resting angular position. Then the acceleration is provided with a reversed second sense of rotational direction towards the reversing angular position. The corresponding applies for the deceleration process for which the rotor is rotated with a first sense of rotational direction to the resting angular position during the deceleration with a subsequent reversing rotation with a reversed second sense of rotational direction from the resting angular position into the unloading position. Said in different words, by means of the inventive measures it is possible to "take a run-up" or that for the deceleration a kind of "overswinging" of the probe beyond the six o'clock position takes place.

It is possible that the product is fed to the rotor, coupled to the rotor, decoupled from the rotor and/or removed from the rotor in a manual fashion. However, in a preferred embodiment of the invention the product is automatically fed to the rotor and/or automatically removed from the rotor, wherein it is also possible that additionally there is an automatic coupling and/or decoupling of the product to and from the rotor. It has shown that by an automation of this type the handling of the product is improved for the relevant laboratory centrifuge comprising a rotor which rotates around a horizontal rotational axis. The reason for this is in particular that an automated handling of the product in a horizontal manipulation plane is notably easy. Furthermore, for a rotor with a horizontal rotational axis it is possible to provide that the probe is fed to the rotor in an automated fashion and the probe is also removed from the rotor in an automated fashion.

It is possible that the (automated or manual) feeding of the product to the rotor and the removal of the product from the rotor after the centrifugation is provided with different senses of direction (so the feeding with a forth movement and the removal with a reversed movement or return movement). However, for a preferred embodiment according to the invention it is proposed that the automatic feeding of the product to the rotor and the removal of the product from the rotor after the centrifugation is provided with one and the same sense of direction. In this way, it is possible that the manipulation of the product before the centrifugation and the feeding of the products take place on one side from the rotor, whereas the removal and the further manipulation of the centrifuged products take place on the other side of the rotor. For the rotation of the rotor around a horizontal axis this means that the rotational plane of the rotor separates a half space wherein the products are prepared and fed from a half space wherein the product is removed (in some cases with further processing). Here, preferably the movements of the products during the feeding process and the removal process have an orientation parallel to the rotational axis of the rotor. It is possible that for the feeding the product is introduced into a through recess of the rotor and for the removal removed on the other side from the through recess of the rotor. It is e.g. possible that the recess is formed by a recess of a rotor which is in particular disc-like, said recess having a cross-section with a closed edge. However, it is also possible that the recess is formed at the edge of a rotor being e.g. disc-like so that it is also possible that the recess has a cross-section with an open edge.

For another embodiment of the inventive method an unbalanced mass of the rotor (which depends on the mass of the product) is reduced by a balancing device. Here, it is possible that the balancing device is operated automatically or manually. For one example, the balancing device is formed with an additional mass which is held at the rotor diametrically opposed to the position of the product, wherein it is possible to change the distance of the additional mass dependent on the mass of the product. Here, it is possible that the distance of a balancing mass from the rotational axis is adjusted in a stepless fashion or in steps wherein the adjustment might be provided by an actuator or a manual adjusting device. It is also possible that the balancing mass cooperates with a scale so that for a known type of a product it is possible to selectively effect a position of the balancing mass defined by the scale.

For another embodiment of the invention, the product is fixed to the rotor by a mount. Here, it is possible that the product is directly fixed by the mount of the rotor. A fixation might be provided in any way, in particular by a clamping of the product or by holding of the product by a holding, latching or locking device. It is also possible that the fixation is actuated by centrifugal forces due to the rotation of the rotor. In an extreme case, it is also possible that the mount only comprises an accommodation for the product into which the product is inserted in radial outer direction. In this case, the product is supported in radial outer direction at a step or shoulder or a bottom of the accommodation. In this case, in the resting position as well as during the start of the rotor the product is pressed by the gravitational force and the increasing centrifugal force against the bottom or step or shoulder of the accommodation. With increasing angular velocity of the rotor the pressing of the product against the bottom or step or shoulder of the accommodation is increased. It will be understood that it is possible that additionally there might also be a securing frictional force between the accommodation and the product, a latching or locking device or any other securing device.

For another embodiment of the invention, the mount if formed with an accommodating body. Here, the accommodating body forms, on the one hand, an accommodation, wherein the product is arranged and/or at which the product is held. On the other hand, the accommodation forms a coupling region. By the coupling region it is possible to mount the accommodating body with the product arranged in the accommodation to the rotor. In this way it is possible to specifically design, on the one hand, the accommodation for the interaction with the product and, on the other hand, the coupling region for the interaction with the rotor. Here, it is possible that the product is fed to the accommodation of the accommodating body when the accommodating body has already been mounted to the rotor. However, preferably the insertion of the product into the accommodation of the accommodating body takes place before feeding the product with the accommodating body to the rotor and before coupling the accommodating body in the coupling region to the rotor. The use of an accommodating body might e.g. be of advantage, if it is of interest to centrifuge different products with different geometries with one and the same rotor. In this case, it is possible to use accommodating bodies that have the same coupling regions but differing accommodations for the different products with different geometries. It is also possible that the accommodation is formed by an adapter which specifically adapts the accommodation to the specific geometry of the product. Furthermore, it is possible that the accommodating body is fixed at the rotor by a latching or locking device actuated by centrifugal forces.

For another embodiment of the invention, a rotational angular position of the rotor is sensed by a sensor. In this case, the drive unit of the rotor is controlled (open loop control or closed loop control) on the basis of the sensed rotational angular position. It is e.g. possible that a loading and/or unloading position of the rotor and/or a resting angular position of the rotor is specifically brought about on the basis of the sensed rotational angular position. Furthermore, it is possible that the application of an accelerating and/or decelerating torque by the drive unit is controlled on the basis of the rotational angle sensed by the sensor such that with the arrival in the reversing angular position the required angular velocity has been reached.

For a further embodiment of the invention, a drive unit controlled on the basis of a rotational angular position is used. Preferably a drive unit with a rotating field is used. When compared to common controls of electric motors, drive units with a field-oriented control (also abbreviated as "FOC") allow a precise control on the basis of the torque and the velocity. For the control of rotating field machines, the machine parameters are separated into flow building components and torque building components such that a technical decoupling of the machine states is reached as physically known for direct current machines. Besides the high electrical efficiency reached with a field-oriented control in particular two characteristics of the field-oriented control are of importance for the invention: On the one hand, the field-oriented control allows a maximization of the applicable torque which is in some cases of advantage for the high accelerations required here. On the other hand, the field-oriented control (here preferably being formed with a rotational angle sensor (which might already be provided by the drive unit or might be a rotational angle sensor of the rotor)) provides a precise positioning of the rotor which is e.g. indispensable for the provision of the loading and unloading position. Furthermore, when using a drive unit with a field-oriented control, additional servomotors or actuators for the exact positioning of the rotor are not required.

The invention also proposes a laboratory centrifuge which is equipped with a drive unit controlled by a control unit (covering both an open loop control as well as a closed loop control) such that it is possible to perform the method as explained above in the laboratory centrifuge.

For a further embodiment of the inventive laboratory centrifuge, the rotor forms an accommodation for the product. Here, the rotor on one side of the rotor forms an inlet opening of the accommodation. Via this inlet opening it is possible to feed the product to the accommodation. On the other side of the rotor a removal opening of the accommodation is provided. By the removal opening it is possible to remove the product from the accommodation after the centrifugation. Accordingly, it is possible to pass the product through a through recess of the rotor which in the respective ends forms the removal opening and the input opening for the loading and unloading.

It is possible that a longitudinal or drive axis of the drive unit has an orientation and position coaxial to the rotational axis of the rotor. For another proposal of the invention the rotor is driven with a longitudinal or drive axis of the drive unit having an orientation parallel to the rotor and being offset from the rotational axis of the rotor. This might in some cases lead to improved constructional spaces.

It is possible to further improve the conditions for the constructional space if for this embodiment the drive unit is arranged offset in circumferential direction around the rotational axis to the accommodation or mount for the product. For this embodiment, it is possible to arrange the drive unit in one part of the circumferential region of the rotor, whereas in another part of the circumferential region of the rotor (which contains the accommodation or mount) the required measures are taken for feeding and removing the product from the accommodation or mount. This might result in a very compact design.

For an inventive laboratory centrifuge a sensor is provided for sensing the rotational angular position of the rotor. Furthermore, the laboratory centrifuge comprises a control unit. The control unit is equipped with control logic which controls (in open loop control or closed loop control) the drive unit of the rotor on the basis of the sensed rotational angular position of the rotor.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
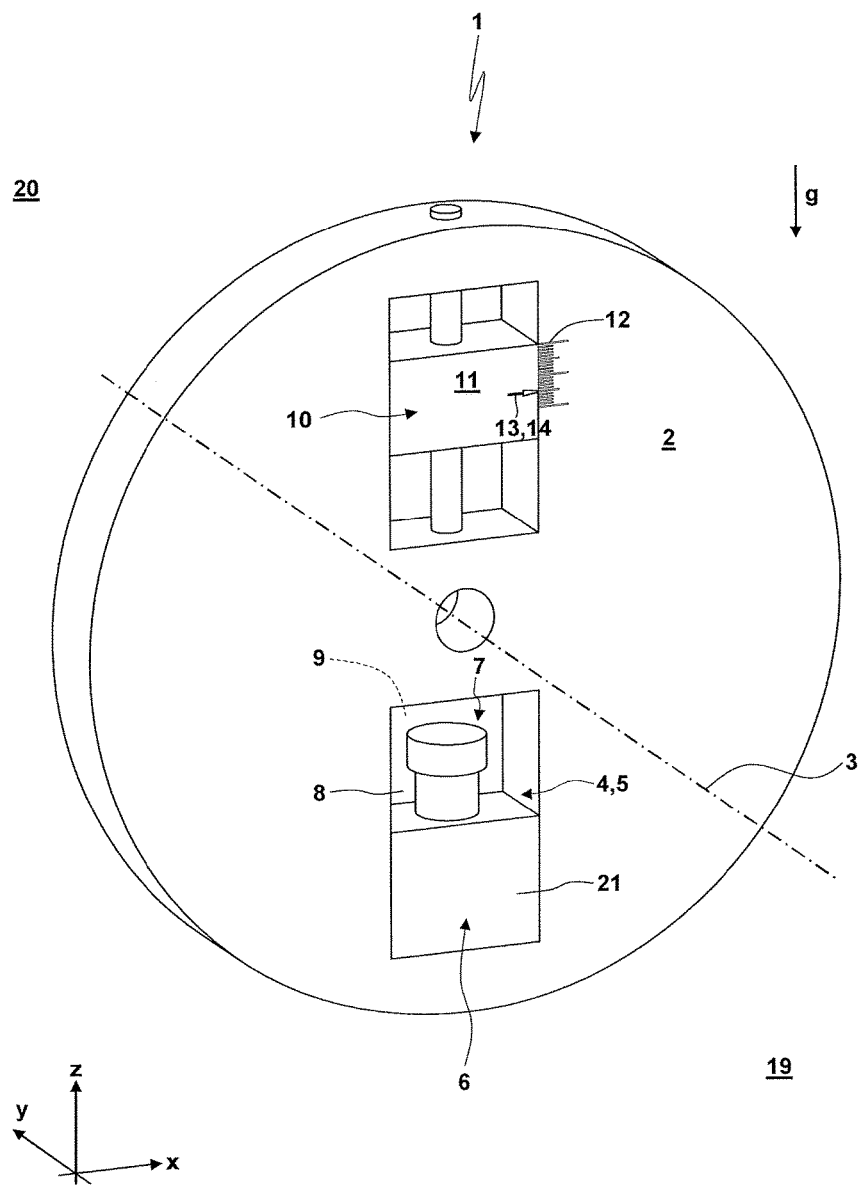
FIG. 1 schematically shows a part of a laboratory centrifuge in a three-dimensional inclined view from the front side.

In FIGS. 1 to 3 and 7, 8 the special directions are denoted in a Cartesian coordinate system, wherein the directions x, y span a horizontal plane, whereas the direction z denotes a vertical direction. Furthermore, in these figures g denotes the gravitational acceleration.

In the present application, the angular positions of the product with respect to the rotational axis of the laboratory centrifuge are explained under referral to a clock-face. For this virtual clock-face, the twelve o'clock position correlates with the coordinate z, wherein here the small hand of the clock has an orientation opposite to the gravitational acceleration g. Instead, the sense of the direction of the small hand of the clock in the six o'clock position corresponds to the sense of direction of the gravitational acceleration. The orientation of the small hand of the clock in the three o'clock position corresponds to the direction x.

In the present application, for simplification reference is made to a "centrifugal force" or "centrifugal acceleration". The applicant is aware of the fact that strictly speaking a "centrifugal force" or "centrifugal acceleration" does not exist and the centrifugal force and the centrifugal acceleration only correspond to a reaction upon a centripetal acceleration (cp. also the mechanical approach of d' Alembert).

The laboratory centrifuge 1 (here only partially shown) comprises a rotor 2. The rotor 2 rotates around a horizontal rotational axis 3 having an orientation in the direction y. For the shown embodiment, in a rough approximation the rotor 2 is disc-shaped without this necessarily being the case. The rotor 2 forms a mount 4 or accommodation 5 by which or in which a product 6 is releasably held at the rotor 2. For the shown embodiment, the mount 4 or accommodation 5 is formed by a through recess 7 of the rotor 2. The through recess 7 extends in the direction y through the rotor 2. Here, the through recess 7 is formed by a cross-section having a closed edge. The through recess 7 forms an input opening 8 on the front side in FIG. 1 by which it is possible to feed the product 6 to the mount 4 or the accommodation 5. In a corresponding way, the through recess 7 forms a removal opening 9 on the rear side in FIG. 1 by which it is possible to remove the product 6 from the mount 4 or accommodation 5. In the case that the laboratory centrifuge 1 is used with an automatized feeding of the product 6 as well as an automatized removal of the product 6 in this fashion a continuous flow of products 6 with a uniform feeding movement in the direction y (so parallel to the rotational axis 3) can be provided. Here the feeding of the product 6 takes place through the input opening 8 into the accommodation 5 or to the mount 4 with the same sense of direction as the removal of the product 6 from the mount 4 or the accommodation 5 through the removal opening 9 after the centrifugation.

Diametrically opposed to the mount 4 or accommodation 5 for the product 6 the rotor 2 comprises a balancing device 10 which serves for reducing or removing any unbalanced mass of the rotor 2. For this purpose, the balancing device 10 comprises a balancing mass 11. The distance of the balancing mass 11 from the rotational axis 3 can be adjusted for removing any present unbalanced mass. For the shown embodiment, the balancing device 10 comprises a scale 12. A marker 13 (here an arrow 14) of the balancing mass 11 moves along the scale 12 with a change of the distance of the balancing mass 11 from the rotational axis 3. By means of the scale 12 it is possible to choose predefined positions of the balancing mass 11 during the adjustment of the balancing device 10 which might e.g. correlate with different products 6, in particular different weights of the products 6.

Figure 2:
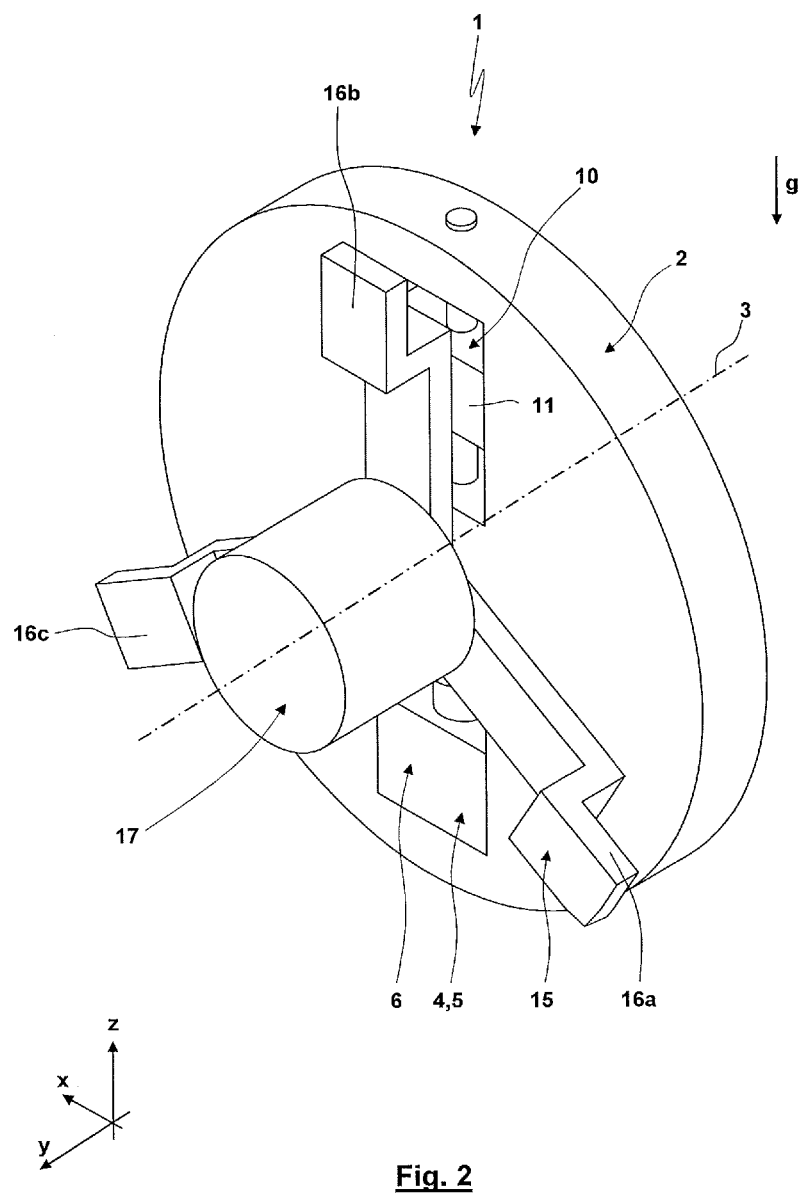
FIG. 2 schematically shows the part of the laboratory centrifuge according to FIG. 1 in a three-dimensional inclined view from the rear side.

According to FIG. 2, the rotor 2 is rotatably supported by a supporting rack 15. For the shown embodiment, the supporting rack 15 is formed with three supporting arms 16a, 16b, 16c extending in a direction radial to the rotational axis 3. The supporting arms 16a, 16b, 16c are supported in their radial outer end regions by a socket, frame or housing (here not shown) of the laboratory centrifuge. The rotor 2 is driven by a drive unit 17. For the embodiment according to FIGS. 1 to 3 the drive shaft of the drive unit 17 is arranged with an orientation coaxial to the rotational axis 3.

Figure 3:
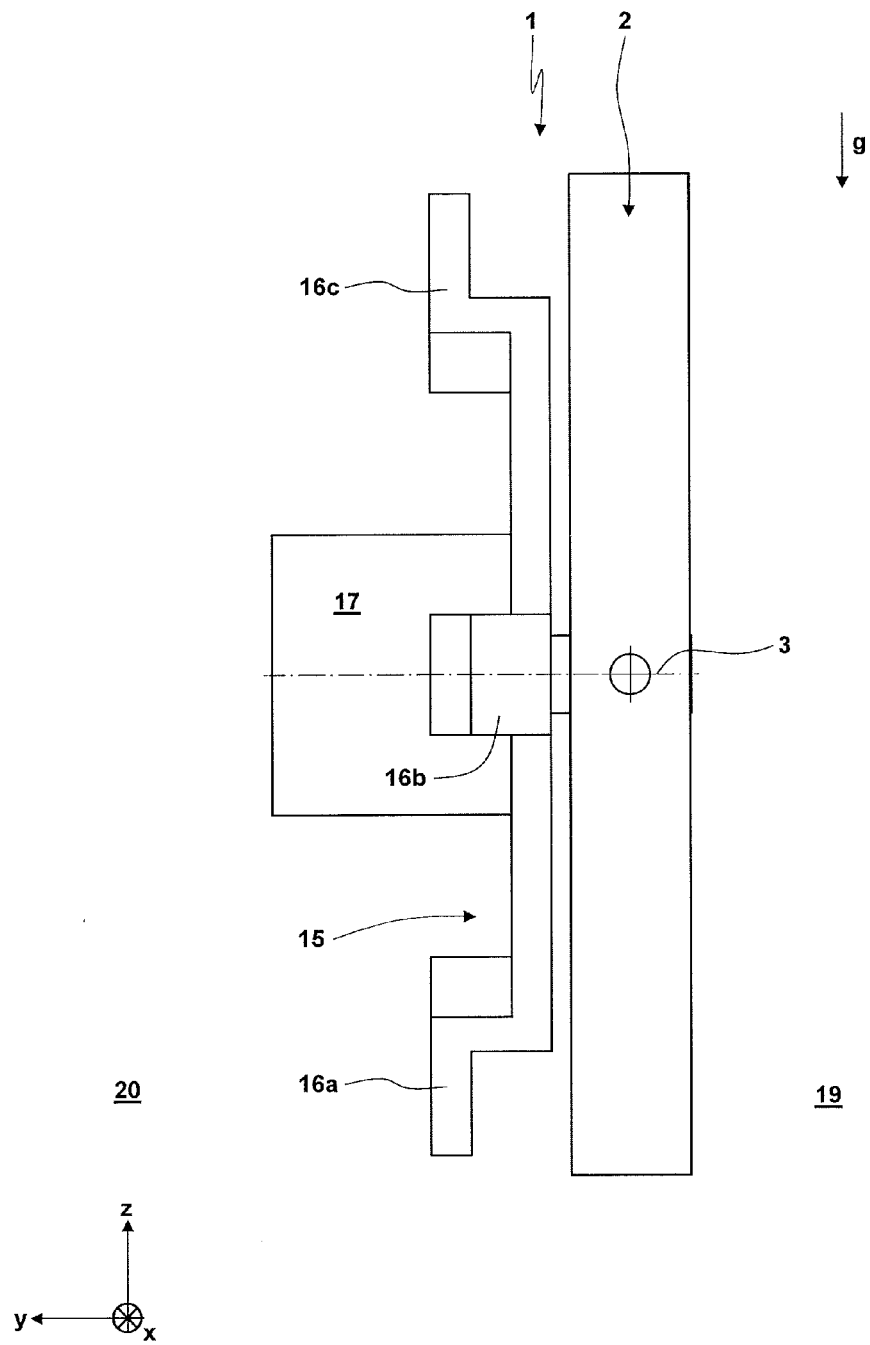
FIG. 3 schematically shows the part of the laboratory centrifuge according to FIGS. 1 and 2 in a top view.
Figure 4:
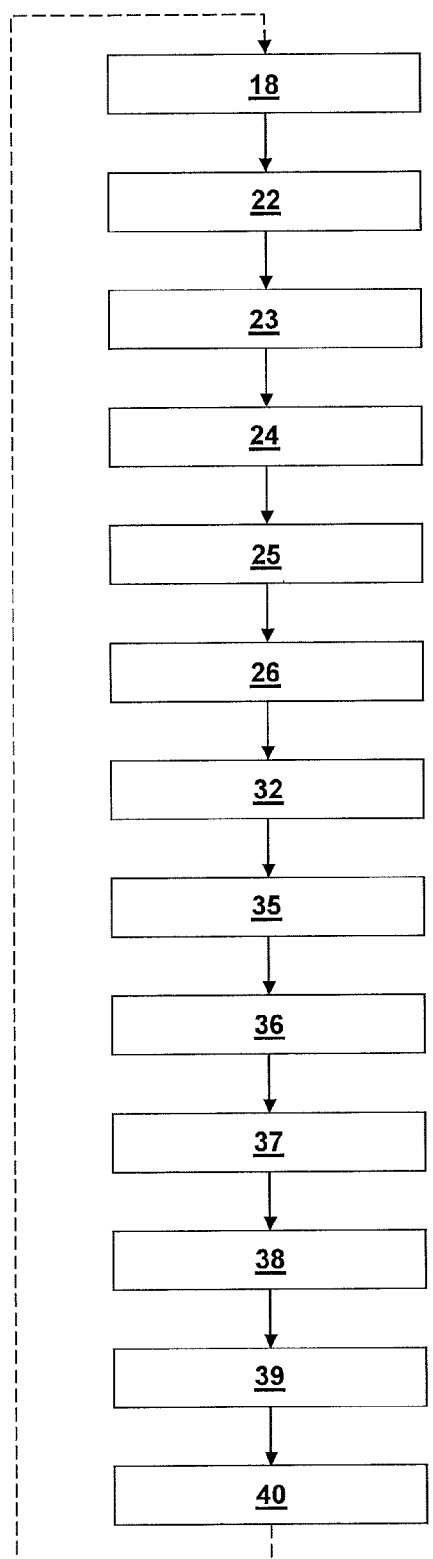
FIG. 4 very schematically shows a method for operating a laboratory centrifuge.
Figure 5A:
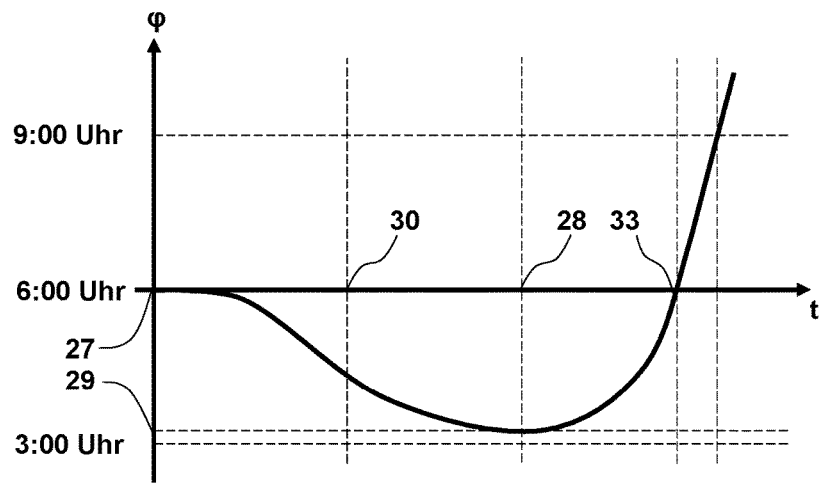
FIGS. 5A, 5B, and 5C show the angular position of the product over time, the angular velocity of the product over time and the angular acceleration of the product over time during the start-up of a laboratory centrifuge, respectively.
Figure 5B:
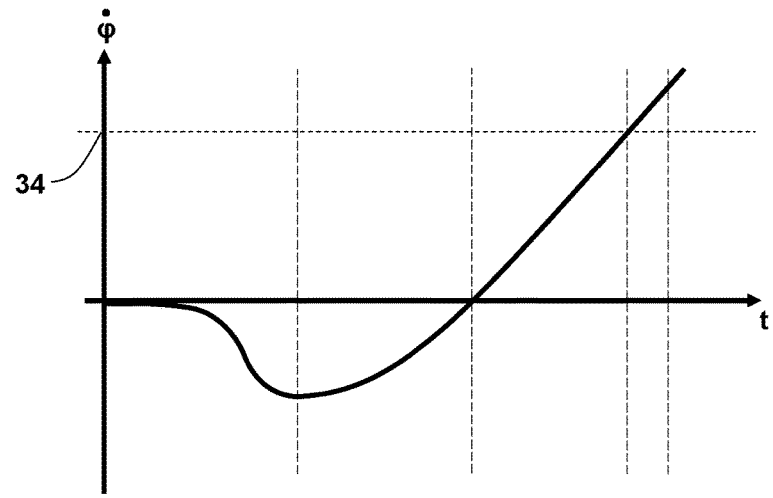
Figure 5C:
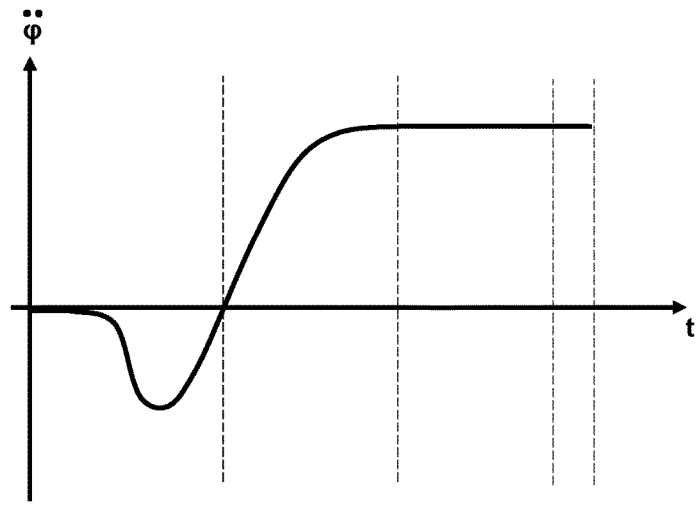

A method for the operation of a laboratory centrifuge according to FIGS. 1 to 3 is explained on the basis of FIG. 4. Here, reference is made to the temporal development of the angular position, the angular velocity and the angular acceleration according to FIGS. 5A, 5B, and 5C:

In a method step 18 the product 6 is prepared or provided. This preparation or provision of the product 6 takes place in a half space 19 which is located in front of the rotor 2 and separated by the rotational plane of the rotor 2 from a half space 20 located behind the rotor 2. Here, it is possible that products 6 that will be successively centrifuged by the laboratory centrifuge 1 are individually provided, are provided in a group of products 6 or provided in a discontinuous or continuous feeding process with a plurality of products 6. If the product 6 is not directly introduced into the mount 4 or accommodation 5 of the rotor 2 but introduced under use of an accommodating body 21 (which might also be a probe carrier) in a method step 22 at least one product 6 is introduced into a recess of the accommodating body 21. Subsequently in a method step 23 the rotor is moved into an angular position which forms the loading position. This loading position is e.g. the position taken in FIG. 1 which is a six o'clock position. Subsequently in a method step 24 by a suitable actuator or a manipulation device the at least one product 6 (preferably with the accommodating body 21) is introduced into the accommodation 5 through the input opening 8. In the subsequent method step 25 the product 6 is fixed to the mount 4 of the rotor 2 formed by the accommodation 5. In the case of the fixation of the product 6 to the mount 4 of the rotor 2 by an accommodating body 21 in this method step a coupling region of the accommodating body 21 is coupled to a corresponding counter coupling region of the rotor 2 formed by the mount 4. Then, in a method step 26 within the time interval ending with the point of time 28 the rotor 2 is slowly transferred from the six o'clock position according to FIG. 1 (which forms the feeding or loading position 27) into the resting angular position 29. For this purpose, within the time interval ending with the point of time 28 the rotor 2 is at first accelerated in counter-clockwise direction and then subsequently decelerated such that at the point of time 28 in the resting angular position 29 the rotor comprises an angular velocity of zero. It is possible that the rotor 2 remains for a certain span of time in the resting angular position 29. However, preferably in the resting angular position 29 the angular velocity immediately reverses. Preferably, the resting angular position 29 is an angular position in the region between the three o'clock position and the six o'clock position. If there is a reduced predisposition of the probe or substance for leaking or exiting or an increased viscosity of the substance or an increased capillary attraction it is possible that the resting angular position 29 is chosen closer to the three o'clock position. In a subsequent method step 32 the rotor 2 with the product 6 held at the rotor is accelerated from the resting angular position 29 with a reversed sense of the rotational direction, so in clockwise direction. During this accelerating process, at the point of time 33 the product 6 passes the six o'clock position, which coincides with a passing of the loading or feeding position 27. Due to the acceleration from the resting angular position 29 the rotor 2 and the product 6 already comprise an angular velocity 34 which is larger than zero when passing the six o'clock position. Accordingly, by means of the prior rotation from the feeding or loading position 27 into the resting angular position 29 with the acceleration from the resting angular position 29 it is possible to "take a swing" with the provision of an energy level of the rotor 2 and the product 6 in the six o'clock position being larger than the energy level when starting from the six o'clock position. With the continued acceleration in clockwise direction the product 6 arrives (under passage of the nine o'clock position) with continuously increasing angular velocity in the twelve o'clock position. Dependent on the driving power of the drive unit 17 it is possible to then further increase the accelerating torque or to keep the torque constant at a maximum torque with a resulting constant angular acceleration resulting therefrom (cp. FIG. 5C). Subsequently in a method step 35 the actual centrifugation with the predetermined angular velocity or a predetermined course of the angular velocity takes place. If the centrifugation is completed, the rotor 2 is decelerated. The deceleration of the rotor 2 is provided such that in a method step 36 by suitable control of the drive unit 17 it is guaranteed that in the twelve o'clock position (which forms the reversing angular position) an angular velocity is in an angular velocity region wherein the centrifugal acceleration is slightly larger than the gravitational acceleration. Preferably, the centrifugal acceleration $$a_z = \omega^2 r$$

with ω: angular velocity and
r: distance of the center of gravity of the probe from the rotational axis is in a region for which $n \times g \leq a_z \leq (n+1) \times g$ with n=1, 2, 3, 4, 5 or 6 holds. It is also possible that the drive unit 17 is controlled such that in the reversing angular position there is an exact defined angular velocity so that there is a centrifugal acceleration being larger than the gravitational acceleration. In the state achieved in this way in the method step 37 the rotor 2 with the product 6 held at the rotor is braked to an angular velocity of zero for the arrival of a resting angular position being located between the three o'clock position and the nine o'clock position, preferably between the six o'clock position and the nine o'clock position. Accordingly, the braking takes place in an angular region of less than 270°. Subsequently in a method step 38 with a reversal of the sense of rotational direction the rotor 2 with the product 6 held at the rotor is rotated back in counter-clockwise direction into an unloading or removal position which is preferably the six o'clock position. In the method step 39 the product 6 is then released from the mount 4. Finally, in the method step 40 the product 6 is then removed from the rotor 2 which is preferably accomplished through the removal opening 9.

Figure 6A:
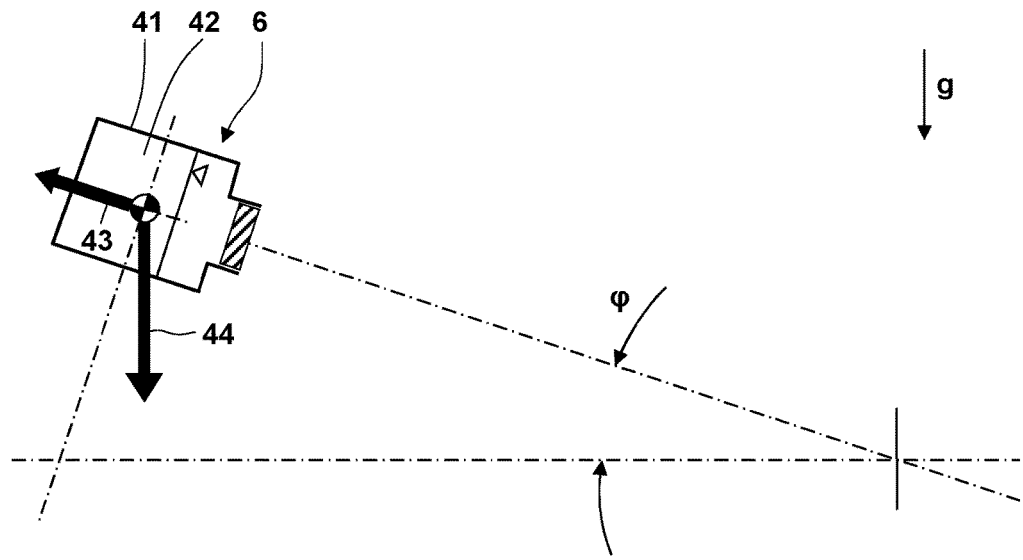
FIGS. 6A and 6B show a product during the start-up of the laboratory centrifuge with the forces acting upon the product and the associated mechanical free body diagram, respectively.

FIG. 6A schematically shows the product 6 with the forces acting upon the product during the start-up approximately in a ten o'clock position (wherein here for simplification a tangential acceleration due to the acceleration of the rotor 2 during the start-up is not shown).

Figure 6B:
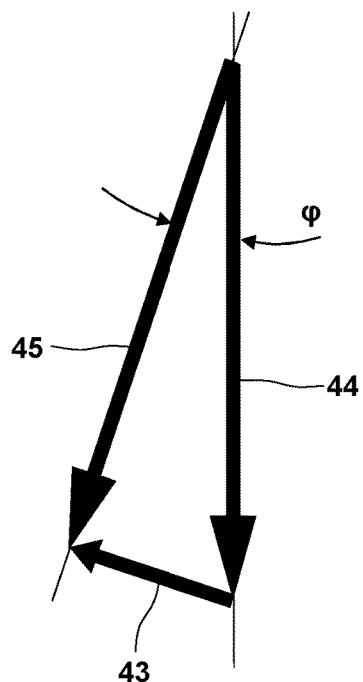

As can be seen from FIG. 6A, without any centrifugal force 44 the probe 42 arranged in the container 41 of the product would be accelerated in radial inner direction by a component of the gravitational force 44. Accordingly the probe 42 would be accelerated away from the bottom of the container 41 towards the lid. For guaranteeing that a resultant 45 resulting from the centrifugal force 43 and the gravitational force 44 does not have any force component in radial inner direction it is required that (as resulting from the free body diagram of FIG. 6B) the following holds:

$$\sin \varphi = F_z / F_G$$

with: $F_z$: centrifugal force,
$F_G$: gravitational force and
φ: angle between the radial connecting axis of the rotational axis 3 and the center of gravity of the product 6 with respect to the horizontal plane.

Due to the fact that the centrifugal force $F_z$ results from the product of the squared angular velocity and the distance of the center of gravity of the product 6 from the rotational axis 3, the velocity caused by the drive unit 17 for angular positions above the nine o'clock position has to fulfill the following criterion:

$$\dot{\varphi} \geq \sqrt{\frac{g \sin \varphi}{R}}$$

As a consequence, for φ=90° in the reversing angular position the centrifugal acceleration $\dot{\varphi}^2 R$ has to correspond to the gravitational acceleration g or has to be larger than the gravitational acceleration g.

Figure 7:
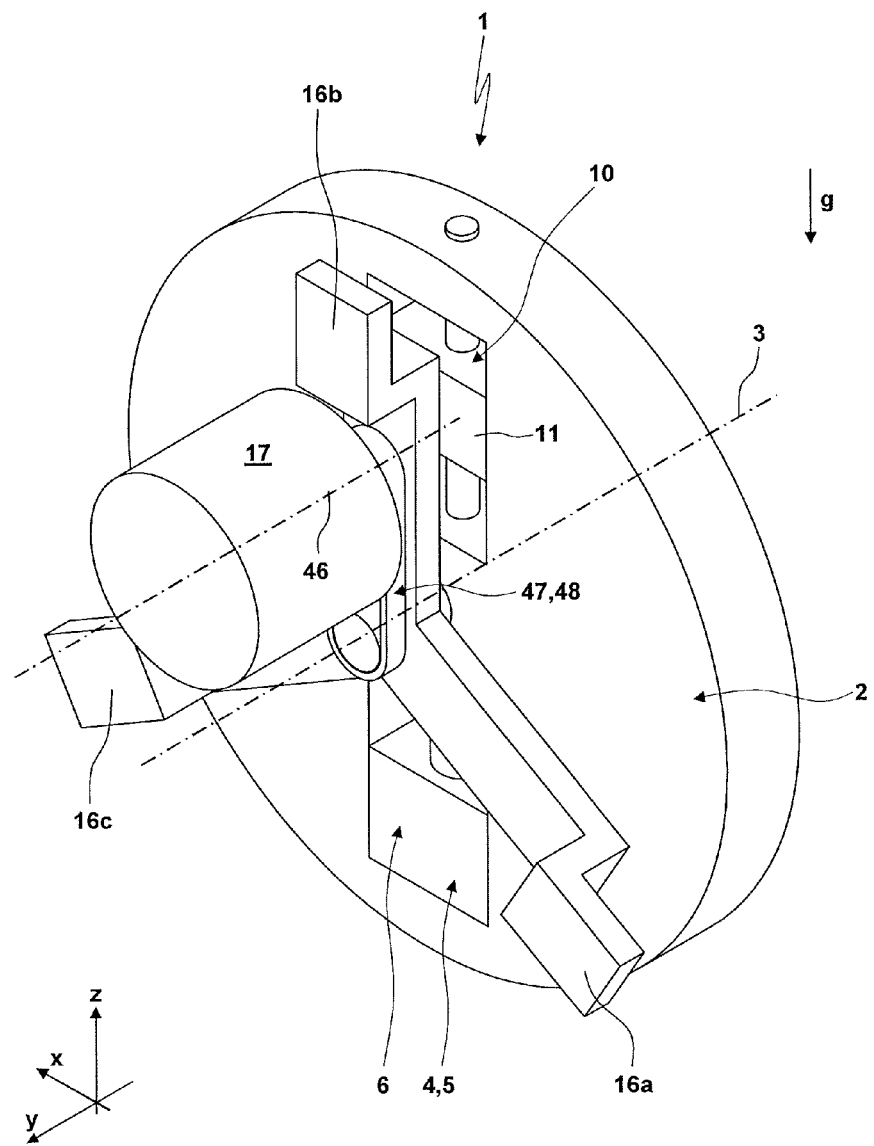
FIGS. 7 and 8 schematically show different views of a part of an alternative embodiment of a laboratory centrifuge.
Figure 8:
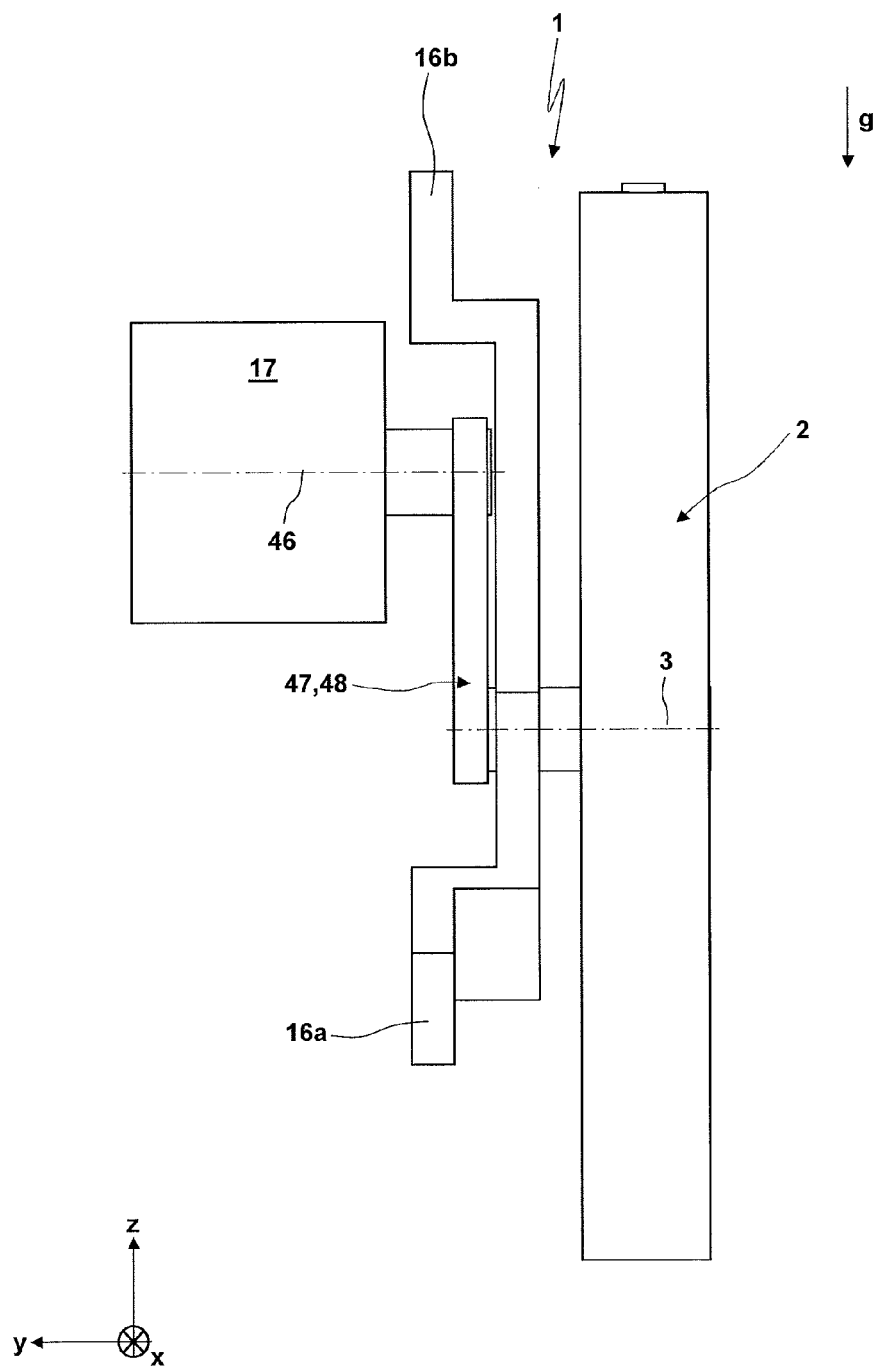

FIGS. 7 and 8 show an alternative embodiment of a laboratory centrifuge 1, wherein the drive unit 17 is not arranged coaxial to the rotational axis 3. Instead a drive axis or longitudinal axis 46 of the drive unit 17 and a drive shaft are arranged parallel and offset to the rotational axis 3. In this case, the drive unit 17 is coupled by a transmission connection or geared connection (e.g. a pulling means drive 48) to the rotor 2. The transmission connection or geared connection 47 might also provide the offset of the drive axis or longitudinal axis 46 from the rotational axis 3. It is possible that the transmission connection or geared connection 47 additionally provides a gearing-up or gearing-down. For the shown embodiment, the drive unit 17 is positioned diametrically opposed with respect to the rotational axis 3 to the position of the accommodation 5 of the rotor 2 in the six o'clock position. Preferably, the drive unit 17 is arranged in the upper half plane of the rotor (nine o'clock position to three o'clock position), whereas in the loading or feeding position 27 and/or the unloading position the accommodation 5 is located in the lower half plane (three o'clock position to nine o'clock position). Accordingly the drive unit 17 does not interfere with the feeding and removal of the products 6 to and from the rotor 2 and improved constructional space conditions result. For this purpose, the supporting rack 15 comprises a recess or gap as shown in the region of the accommodation 5 and in front of and behind the same in the loading position 27 and/or the unloading position through which it is possible to gain access to the accommodation 5.

Figure 9:
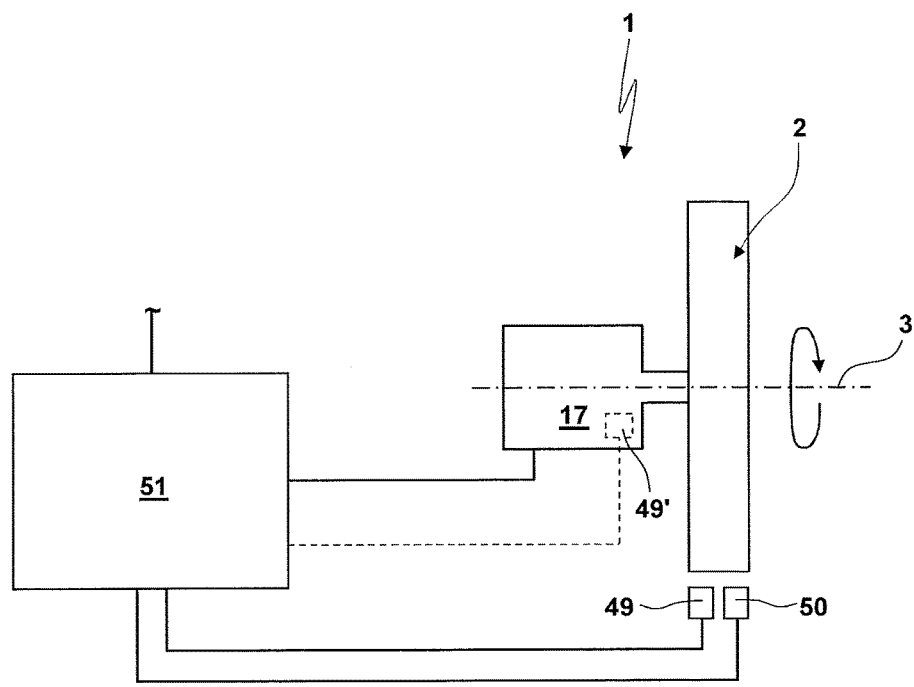
FIG. 9 schematically shows a laboratory centrifuge with the interaction of a control unit with the drive unit and sensors.

FIG. 9 very schematically shows a sensor 49 for sensing an angular position of the rotor 2 as well as a sensor 50 for sensing the angular velocity of the rotor 2. The measuring signals of the sensors 49, 50 are transmitted to a control unit 51. On the basis of these measuring signals the control unit 51 controls the drive unit 17 for the execution of the method explained above. Here, it is possible that the control unit 51 communicates with other control units, e.g. also for the control of manipulation devices and loading and unloading devices for the loading and unloading of the product 6. It is also possible that only a rotational angular position is sensed by a sensor 49 and that the angular velocity signal is derived from the sensed rotational angular position. It is also possible that the drive unit 17 is already controlled on the basis of a rotational angular position such that the control unit 51 only controls a predefined rotational angular position and/or that an angular signal of the drive unit 17 is processed by the control unit 48. FIG. 9 shows with dashed line that the sensor 49 for sensing the angular position of the rotor 2 (or in a corresponding way also a sensor 50 for sensing the angular velocity of the rotor 2) might also be directly formed by a sensor integrated into the drive unit 17. This sensor might e.g. already be present in the drive unit 17 for the operation of the same.

The product 6 might e.g. be blood-tubes having typical dimensions of 13×75 mm, 13×100 mm or 16×100 mm. Preferably, the acceleration is chosen such that when arriving at a horizontal orientation of the product (nine o'clock position) a centrifugal acceleration being larger than 2×g has been reached. The corresponding applies for the deceleration, wherein here preferably in the reversing angular position (so the twelve o'clock position) a centrifugal acceleration of at least 2×g is effective which is then braked or decelerated over an angular region of 180° to the six o'clock position to an angular velocity of zero. Here, an overswinging beyond the six o'clock position is possible in an extent that a further compensation of the effect of the gravitational field, gravitational force and braking effect of the products 6 is generated in order to avoid a remixing of the components of the probe 42 which have previously been separated by centrifugation. In some cases, gel-tubes might be used as containers 41 which in some cases make the acceleration or deceleration process less critical for the probe 42. If the container 41 is located in the accommodation 5 or mount 4 with the opening facing towards the rotational axis 3 and the bottom located at the radial outer side from the rotational axis 3 with a radial orientation of the longitudinal axis of the container 41 the gravitational field for the separation by centrifugation specifically acts towards the bottom of the container 41. When removing the container 41, the horizontal orientation of the separation limit at least reduces the risk of a remixing with the removal from the laboratory centrifuge. It would only be possible to achieve a result of this type under use of swing-bucket rotors, whereas the separation limiting line for rotors with fixed angle typically forms an angle which is not perpendicular to the normal of the container bottom.

Preferably, the accommodating body 21 forms a vessel holder which is fixedly or exchangeably mounted to the rotor 2. An exchangeable vessel holder is designated for the use as a part of a linear or disc-shaped transportation system by which it is possible to transport the vessel to further process steps. The drive unit 17 and the supporting rack 15 are mounted in a housing (not shown here) for providing the security. By damping elements between the drive unit 17, supporting rack 15 and/or the housing the transfer of the vibrations to the housing is strongly reduced.

Figure 10:
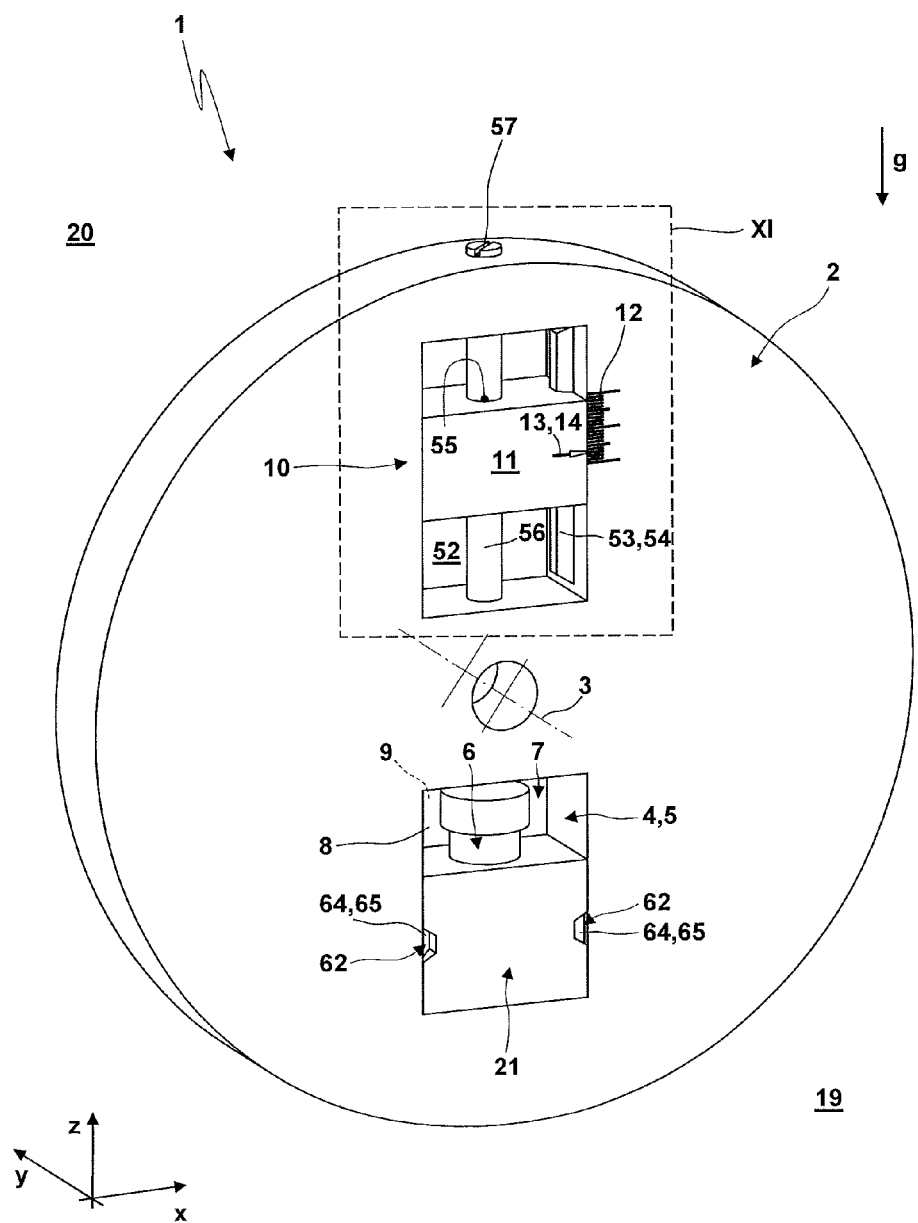
FIG. 10 schematically shows a part of another embodiment of a laboratory centrifuge in a three-dimensional inclined view from the front side.
Figure 11:
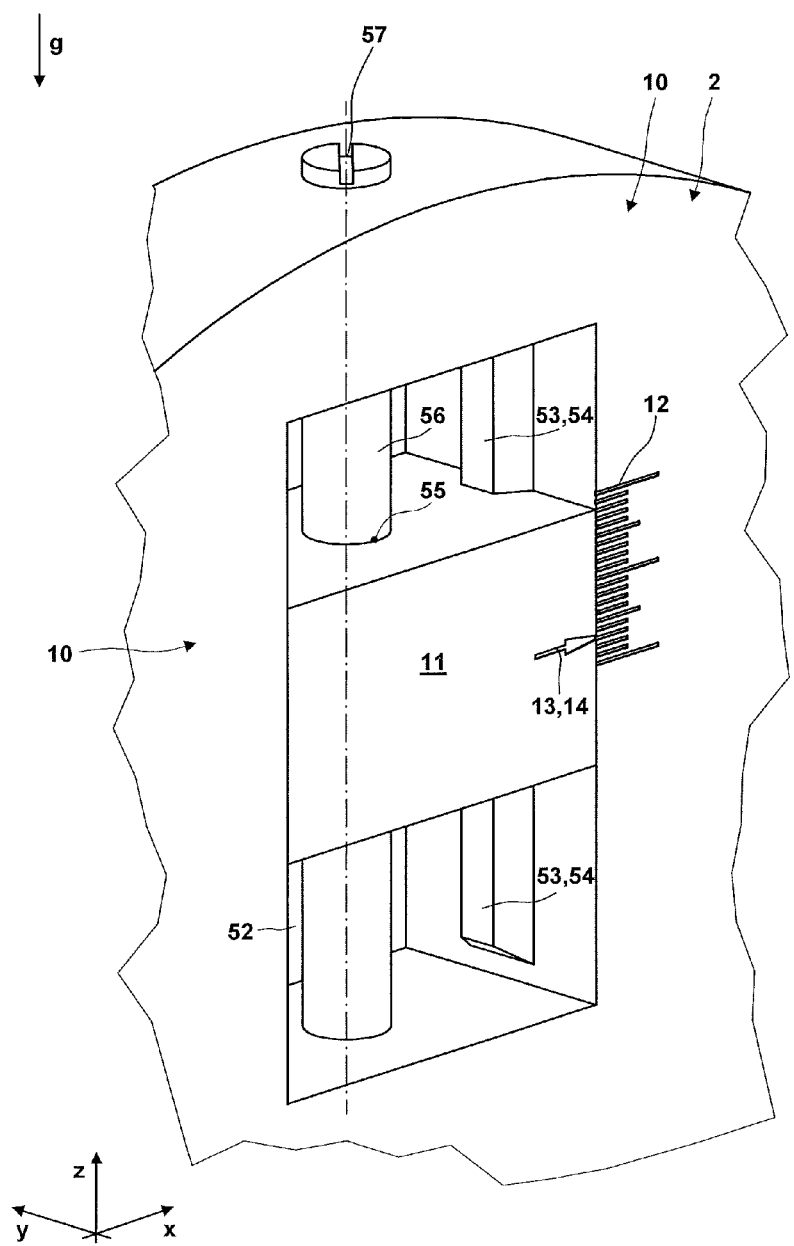
FIG. 11 shows a detail XI of the laboratory centrifuge according to FIG. 10 in the region of a balancing device.
Figure 12:
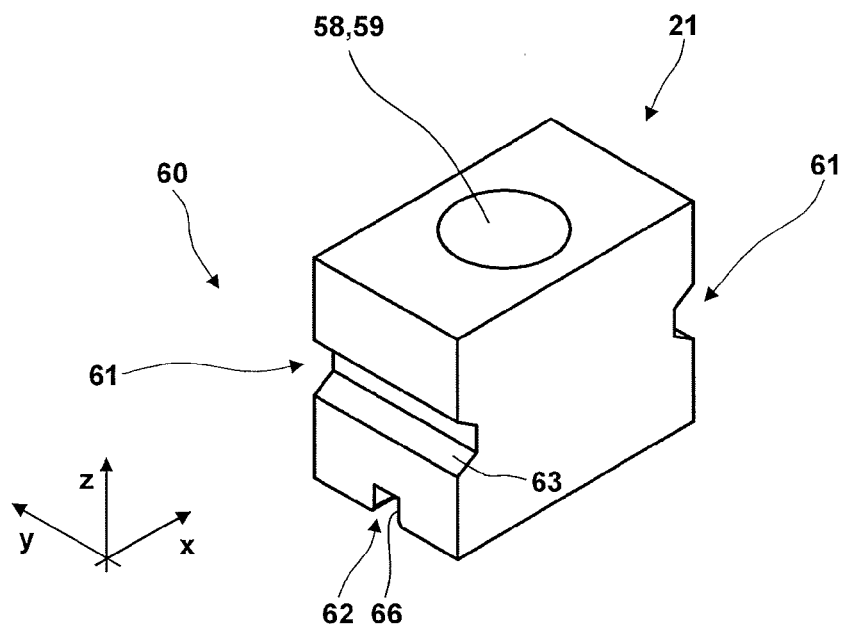
FIG. 12 schematically shows a three-dimensional view of an accommodation body for a product.
Figure 13:
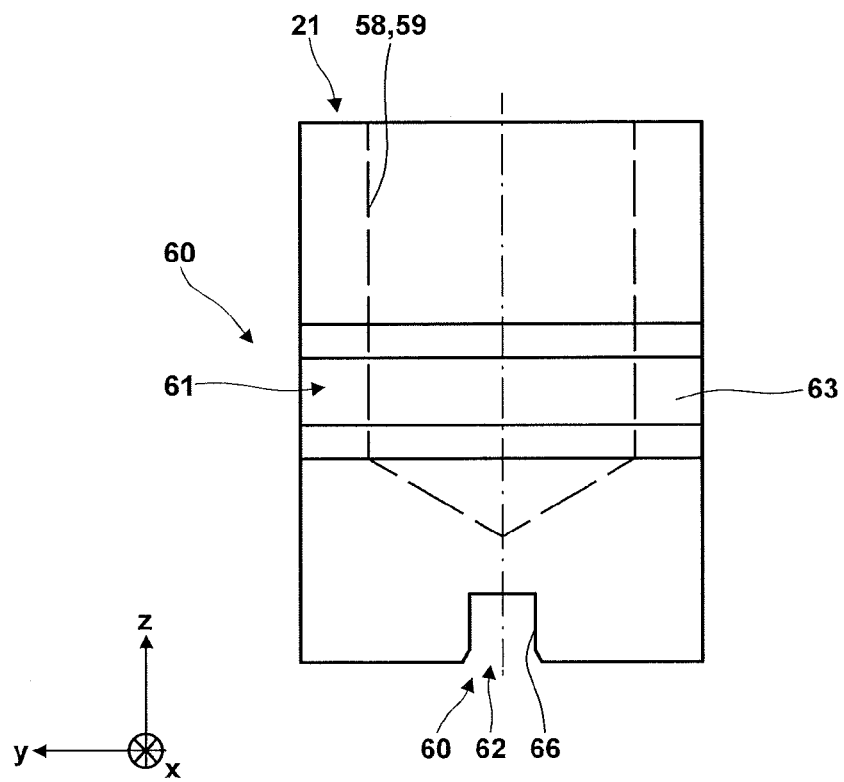
FIG. 13 shows the accommodating body according to FIG. 12 in a side view when viewing transverse to the rotational axis.

FIGS. 10 and 11 show another embodiment of a rotor 2 with a balancing device 10. The balancing mass 11 is arranged in a through recess 52 having a closed edge. Here the through recess 52 comprises a rectangular cross-section. The limitations of the through recess 52 having a radial orientation form two guides 53 (in particular ribs 54) being parallel to each other and having a radial orientation. For a change of the distance of the balancing mass 11 from the rotational axis 3 the balancing mass 11 is guided between the guides 53. For the enablement of the assembly, it is possible that the balancing mass 11 is formed by two or more parts. The balancing mass 11 comprises a through threaded bore 55 having an orientation radial to the rotational axis 3. An actuation rod 56 extends through the threaded bore 55. The actuation rod 56 comprises an outer thread (here not shown) which is located in the axial region cooperating with the balancing mass 11 and its threaded bore 55. In its end regions, the actuation rod 56 is rotatably but axially fixed supported by the rotor 2. With the radial outer end region with an actuation or engaging surface 57 the actuation rod 56 protrudes from the outer surface of the rotor 2. By the actuation surface or engaging surface 57 it is possible to manually rotate the actuation rod 56 (e.g. by a screwdriver or a hexagonal bar and the like) or to automatically rotate the actuation rod 56 (by an actuator actuated by the control unit 51). In this way, by a kind of spindle drive it is possible to displace the balancing mass such that the distance of the balancing mass 11 from the rotational axis 3 is adjusted to compensate any present unbalanced mass.

FIGS. 10, 12, 13 and 14 show further details for the design of the accommodating body 21 as well as of its coupling to the rotor 2. As can be seen from FIGS. 12 and 13, the accommodating body 21 has a block-like or cuboid-like shape. The accommodating body 21 comprises an accommodation 58. It is possible to insert the product 6 into the accommodating body 58 from above. Preferably, the accommodation 58 is a blind bore 59 formed into the accommodating body 21 from above opposite to the direction z. A product 6 with a cylindrical outer surface (e.g. a container or test tube) can be inserted into the accommodation 58. Preferably, the product 6 is frictionally secured in the accommodation 58 or only secured by the gravitational acceleration and any effective centrifugal forces. Furthermore, the accommodating body 21 comprises a coupling region 60 by which it is possible to couple the accommodating body 21 to the rotor 2. For the shown embodiment, the coupling region 60 comprises two coupling region parts 61, 62:

The coupling region part 61 is formed with two grooves 63 having an orientation in y-direction. The grooves 63 are arranged on opposite sides of the accommodating body 21. For the shown embodiment, the grooves 63 have a trapezoidal cross-section opening in outer direction. In the region of the through recess 7 on opposing sides the rotor 2 forms guides 64, here ribs 65. The shape and position of the guides 64 corresponds to the shape and position of the grooves 63. With the introduction of the accommodating body 21 with the product arranged therein into the accommodation 5 the guides 64 or ribs 65 enter into the grooves 63 so that the accommodating body 21 is guided parallel to the rotational axis 3. In a corresponding way, it is possible to remove the accommodating body 21 in the direction of the rotational axis 3 (in the front and/or rear direction). It is possible that the axial position of the accommodating body 21 is only secured by a reduced friction between the grooves 63 and ribs 65. Due to the interaction between the grooves 63 and ribs 65 between the accommodating body 21 and the rotor 2 there remains only an axial degree of freedom having an orientation parallel to the rotational axis 3.

Figure 14:
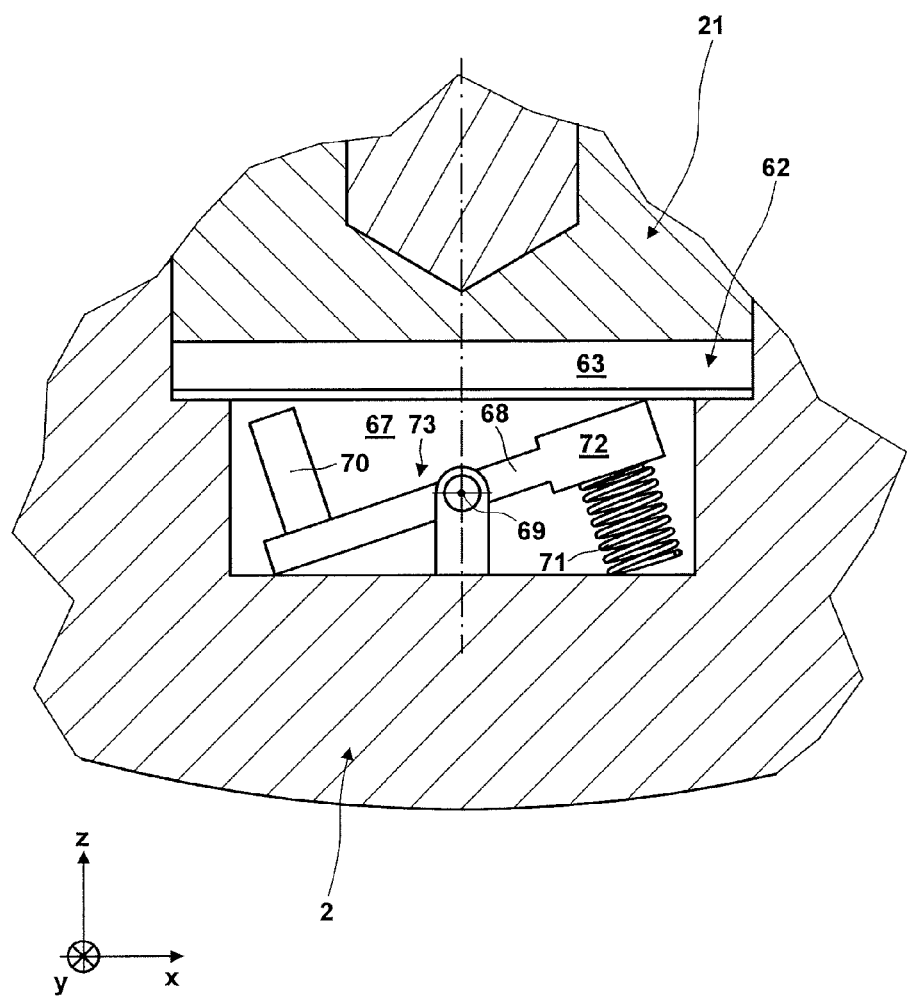
FIG. 14 shows a detail of a locking device actuated by centrifugal forces for locking the accommodating body in the rotor.

The coupling region part 62 serves for removing this axial degree of freedom during the centrifugation. The coupling region part 62 is formed with a groove 66 which is located at the lower side of the accommodating body 21 and has an extension in x-direction, so transverse to the rotational axis 3. As can be seen in FIG. 14, the wall of the rotor 2 (which limits the through recess 7 in radial outer direction) comprises a recess 67. In the recess 67 a pivoting lever 68 is supported for being pivoted around a pivoting axis 69 having an orientation parallel to the y-axis. An end region of the pivoting lever 62 supports a locking element 70. The other end region of the pivoting lever 68 is biased by a spring 71 such that without any rotation of the rotor 2 the pivoting lever 68 takes a pivoting position in which the locking element 70 is displaced in radial outer direction such that the locking element 70 does not interact with the accommodating body 21. If, instead, the accommodating body 21 is located in the middle of the through recess 7 (so corresponding to the predefined axial position), the groove 63 and the locking element 70 are arranged in a common plane having an orientation transverse to the rotational axis 3 with the pivoting lever 68. On the side facing away from the locking element 70 the pivoting lever 68 carries a mass 72. If in the predetermined axial position of the accommodating body 21 the rotor 2 is rotated, a centrifugal force acts upon the mass 72. Under a bias of the spring 71 the centrifugal force causes that the locking element 70 enters into the groove 63 so that a positive form lock is provided for removing the aforementioned axial degree of freedom in y-direction. Here, the pressing of the locking element 70 into the groove 63 is increased with increased angular velocity of the rotor. With the deceleration and stop of the rotor 2 the locking is automatically released which is due to the spring 71 becoming effective with the removal of the centrifugal force. Accordingly, a simple removal of the accommodating body 21 is possible. Accordingly a locking device 73 actuated by centrifugal force is provided by the interaction between the groove 63 and the pivoting lever 68 with the spring 71, the mass 72 and the locking element 70. Any differing latching and/or locking unit for fixing the accommodating body 21 with respect to one, a plurality or all degrees of freedom might also be used.

For the shown embodiment, the accommodating body 21 comprises only one accommodation 58. However, also a plurality of accommodations 58 for a plurality of products 6 might be provided at one single accommodating body 21. Both the balancing mass 11 as well as the accommodating body 21 can be secured against a rotation around the rotational axis 3 by contact surfaces having a large contact area. It might be of advantage if the rotor 2 comprises plain front surfaces from which in particular the accommodating body 21 and the balancing mass 11 do not protrude parallel to the rotational axis 3. This is the case because otherwise an increased air resistance would be effective with a resulting increase of the power consumption for the provision of the rotational movement of the rotor. It is possible that the guide of the balancing mass 11 and/or the accommodating body 21 at the rotor 2 is formed in the type of a "dovetail guide". It is also possible that the recesses 7, 52 are closed in outer direction during the centrifugation, e.g. by a covering plate being manually closed or self-closing due to an actuation by centrifugal forces.

Due to the high acceleration of the rotor a tilting moment resulting from the action of the conservation of the spin might be applied upon the supporting rack 15 or a housing of the laboratory centrifuge 1. In order to avoid that the laboratory centrifuge 1 separates from a base or any support due to this tilting moment, it is possible that for compensating the tilting moment an additional rotor (in particular a rotor disc) is at the same time with the acceleration of the rotor 2 accelerated in opposite rotational direction. In this way, there is a spin compensation or compensation of the tilting moment independent on the effective acceleration. If the additional rotor comprises the same moment of inertia as the rotor 2, it is possible to rotate the additional rotor with the same angular velocity and acceleration. If, instead, an additional rotor with a different moment of inertia is used, a corresponding gearing-up or gearing-down of the rotational movement is required.

It has to be guaranteed that any recesses or openings of the rotor 2 used for the operation (as e.g. the input opening 8 and/or the removal opening 9) are (at least in the relevant operational positions) not covered by the additional rotor.

The specification above based upon the assumption that a laboratory centrifuge is supported by a preferably horizontal base. However, for one embodiment of the invention, it is also possible that the laboratory centrifuge 1 is mounted to a wall of a lab or at any other vertical supporting wall of a facility, a carrier and the like. In this case, the rotational plane of the rotor 2 has an orientation parallel to the wall so that a particularly flat and space-saving construction might be formed.

Preferably, the rotor 2 has a lightweight construction. This is, on the one hand, of advantage concerning the above explained tilting moment which is reduced with a reduced mass or reduced mass moment of inertia. On the other hand, for a rotor 2 having a small mass moment of inertia the required high accelerations can be achieved with comparatively small driving torques of the drive unit 17. For the lightweight design, for example light aluminum alloys, carbon fiber reinforced plastics and/or a combined plastic/metal-design might be used. It is also possible that instead of a massive rotor 2 the rotor is equipped with weight reducing recesses of the material (through recesses or blind recesses, e.g. in radial direction and/or parallel to the rotational axis).

In the present application, in parts reference is made to a sense of the rotational direction "in clockwise direction" or "in counter-clockwise direction". The corresponding also applies to the other sense of rotational direction.

In some cases, a fixation of the rotor 2 in the loading and/or unloading position is of interest. For one embodiment of the invention, a fixing holding moment is applied upon the rotor 2 by the drive unit 17 so that there is no additional fixing device required. However, it is also possible that a fixing of the rotor 2, the drive unit 17 and/or the geared connection 47 is provided by a latching or locking unit which is manually and/or automatically actuated and/or released by an actuator, which is controlled by the control unit 51.

Many variations and modifications may be made to the preferred embodiments of the invention without departing substantially from the spirit and principles of the invention. All such modifications and variations are intended to be included herein within the scope of the present invention, as defined by the following claims.

I claim:

1. A method for operating a laboratory centrifuge for centrifuging a product, the laboratory centrifuge comprising a rotor which rotates around a horizontal rotational axis, the product being held at the rotor at a distance of the rotational axis, wherein
   a) the rotor is accelerated from a resting angular position, wherein the product is located between a three o'clock position and a six o'clock position and comprises a zero angular velocity, with an acceleration such that when the rotor for a first time arrives at a reversing angular position, wherein the product is located in a twelve o'clock position, the rotor has reached an angular velocity such that a centrifugal acceleration which acts upon the product is larger than a gravitational acceleration, b) during the acceleration the product passes a six o'clock position and the acceleration from the resting angular position to the first arrival at the reversing angular position is provided over an angle of between 180° to 270° and c) subsequent to a loading of the product the rotor is transferred with a first sense of rotation from a loading position into the resting angular position from which then the rotor is accelerated with an opposite second sense of rotation towards the reversing angular position.

2. A method for operating a laboratory centrifuge for centrifuging a product, the laboratory centrifuge comprising a rotor which rotates around a horizontal rotational axis, the product being held at the rotor at a distance of the rotational axis, wherein a) the rotor is decelerated from a reversing angular position, wherein the product is located in a twelve o'clock position and comprises an angular velocity such that a centrifugal acceleration acting upon the product is larger than a gravitational acceleration, to an angular velocity of zero for a first arrival in a resting angular position, wherein the product is located between a six o'clock position and a nine o'clock position, b) during the deceleration the product passes a six o'clock position and the deceleration from the reversing angular position to the first arrival in the resting angular position is provided over an angle of between 180° to 270° and c) when moving towards the resting angular position during the deceleration the rotor is rotated with a first sense of rotation and there is a subsequent reversing rotation with an opposite sense of rotation from the resting angular position into an unloading position.

3. The method of claim 1, wherein in the reversing angular position the angular velocity has a magnitude such that the centrifugal acceleration which acts upon the product at least doubles the gravitational acceleration.

4. The method of claim 2, wherein in the reversing angular position the angular velocity has a magnitude such that the centrifugal acceleration which acts upon the product at least doubles the gravitational acceleration.

5. The method of claim 1, wherein in the loading position the product is fed to the rotor in an automatized fashion.

6. The method of claim 2, wherein in the unloading position the product is removed from the rotor in an automatized fashion.

7. The method of claim 5, wherein with a movement in a same sense of direction the product is
a) fed to the rotor and
b) removed from the rotor after the centrifugation in an automatized fashion.

8. The method of claim 1, wherein by a balancing device an unbalanced mass of the rotor is reduced or removed, wherein the unbalanced mass of the rotor depends on the mass of the product.

9. The method of claim 2, wherein by a balancing device an unbalanced mass of the rotor is reduced or removed, wherein the unbalanced mass of the rotor depends on the mass of the product.

10. The method of claim 1, wherein the product is fixed to the rotor by a mount.

11. The method of claim 2, wherein the product is fixed to the rotor by a mount.

12. The method of claim 10, wherein the mount is formed by an accommodating body which forms an accommodation, wherein the product is arranged and which forms a coupling region by which it is possible to fix the accommodation body to the rotor.

13. The method of claim 11, wherein the mount is formed by an accommodating body which forms an accommodation, wherein the product is arranged and which forms a coupling region by which it is possible to fix the accommodation body to the rotor.

14. The method of claim 1, wherein a rotational angular position of the rotor is sensed by a sensor and a drive unit of the rotor is controlled on the basis of the sensed rotational angular position.

15. The method of claim 2, wherein a rotational angular position of the rotor is sensed by a sensor and a drive unit of the rotor is controlled on the basis of the sensed rotational angular position.

16. A laboratory centrifuge for centrifuging a product, the laboratory centrifuge comprising a rotor, which rotates around a horizontal rotational axis, the product being held at the rotor at a distance of the rotational axis, wherein a drive unit is provided, which is controllable by a control unit comprising control logic for carrying out the method of claim 1.

17. A laboratory centrifuge for centrifuging a product, the laboratory centrifuge comprising a rotor, which rotates around a horizontal rotational axis, the product being held at the rotor at a distance of the rotational axis, wherein a drive unit is provided, which is controllable by a control unit comprising control logic for carrying out the method of claim 2.

18. The laboratory centrifuge of claim 16, wherein
a) the rotor forms an accommodation for the product,
b) an input opening of the accommodation is formed on one side of the rotor and
c) a removal opening of the accommodation is formed on the other side of the rotor.

19. The laboratory centrifuge of claim 17, wherein
a) the rotor forms an accommodation for the product,
b) an input opening of the accommodation is formed on one side of the rotor and
c) a removal opening of the accommodation is formed on the other side of the rotor.

20. The laboratory centrifuge of claim 16, wherein the drive unit is offset in circumferential direction around the rotational axis with respect to a loading angular position and/or an unloading angular position of the product.

21. The laboratory centrifuge of claim 17, wherein the drive unit is offset in circumferential direction around the rotational axis with respect to a loading angular position and/or an unloading angular position of the product.

22. The laboratory centrifuge of claim 16, wherein
a) a sensor is provided for sensing the rotational angular position of the rotor and
b) the control unit comprises control logic which controls the drive unit on the basis of the sensed rotational angular position of the rotor.

23. The laboratory centrifuge of claim 17, wherein
a) a sensor is provided for sensing the rotational angular position of the rotor and
b) the control unit comprises control logic which controls the drive unit on the basis of the sensed rotational angular position of the rotor.

24. The laboratory centrifuge of claim 16, wherein the drive unit of the rotor comprises a field-oriented control.

25. The laboratory centrifuge of claim 16, wherein the drive unit of the rotor comprises a field-oriented control.

* * * * *